United States Patent [19]

Ueda

[11] Patent Number: 5,376,058
[45] Date of Patent: Dec. 27, 1994

[54] ARRANGEMENT FOR CONTROL OF LINE FLUID PRESSURE IN AUTOMATIC TRANSMISSION

[75] Inventor: Yoshiaki Ueda, Shizuoka, Japan
[73] Assignee: Jatco Corporation, Fuji, Japan
[21] Appl. No.: 979,329
[22] Filed: Nov. 20, 1992
[30] Foreign Application Priority Data
  May 20, 1991 [JP] Japan .................... 3-143836
[51] Int. Cl.⁵ ............................................. F16H 61/04
[52] U.S. Cl. .................................... 477/160; 477/163; 192/85 R; 192/111 A
[58] Field of Search ............. 192/85 R, 111 A, 109 F; 477/158, 159, 160, 161, 162, 163, 164

[56] References Cited

U.S. PATENT DOCUMENTS

| | | | |
|---|---|---|---|
| 4,440,279 | 4/1984 | Schreiner | 192/111 A X |
| 4,730,521 | 3/1988 | Hayasaki et al. | |
| 5,303,615 | 4/1994 | Iizuka | 477/163 |

Primary Examiner—Richard M. Lorence
Attorney, Agent, or Firm—Foley & Lardner

[57] ABSTRACT

A fluid pressure control arrangement for an automatic transmission comprises a control unit for calculating a shifting frequency and a determining a frictional coefficient of frictionally engageable elements of the transmission. Fluid pressure correction is calculated based on the shifting frequency and a throttle valve opening angle detected by a sensor. A signal indicative of the fluid pressure correction value is output to actuate a solenoid for effecting adjustment of fluid pressure in the automatic transmission for adjusting the line pressure in accordance with the determined frictional coefficient of the frictionally engageable elements to maintain sufficient engagement capacity of the frictionally engageable elements.

17 Claims, 11 Drawing Sheets

FIG. 3

| | C18 | C20 | C22 | C24 | B28 | B26 | OWC 30 | OWC 29 | GEAR RATIO | α1 = 0.440<br>α2 = 0.493 |
|---|---|---|---|---|---|---|---|---|---|---|
| D RANGE 1ST GEAR | | | ○ | | | | ○ | ○ | $\frac{1+\alpha_2}{\alpha_2}$ | 3.027 |
| 2ND GEAR | | ○ | ○ | | ○ | | ○ | | $\frac{\alpha_1+\alpha_2+\alpha_1\alpha_2}{\alpha_2(1+\alpha_1)}$ | 1.619 |
| 3RD GEAR | | ○ | ○ | ○ | | | ○ | | 1 | 1.000 |
| 4TH GEAR | | | (○) | ○ | ○ | | | | $\frac{1}{1+\alpha_1}$ | 0.694 |
| ENGINE BRAKING 1ST GEAR | | | (○) | ○ | | ○ | (○) | (○) | | |
| 2ND GEAR | | ○ | (○) | ○ | ○ | | (○) | | | |
| 3RD GEAR | | ○ | (○) | ○ | | | (○) | | | |
| 4TH GEAR | | | (○) | | ○ | | | | | |
| REVERSE | ○ | | | | | ○ | | | $-\frac{1}{\alpha_1}$ | -2.272 |

( ) : NOT AFFECTING POWER TRANSMISSION

ARRANGEMENT FOR CONTROL OF LINE FLUID PRESSURE IN AUTOMATIC TRANSMISSION

BACKGROUND OF THE INVENTION

1. Field of the Invention

The present invention relates generally to an fluid pressure control arrangement for a vehicular automatic transmission. Specifically, the present invention relates to an arrangement which controls transmission line fluid pressure to maintain sufficient engagement capacity of frictionally engageable elements of the transmission during shifting.

2. Description of the Prior Art

Conventionally, fluid pressure control in an automatic transmission is known in the art. In such conventional automatic transmissions, for example, such as disclosed in U.S. Pat. No. 4,730,521, it is well known to adjust fluid pressure during shifting according to a throttle valve opening angle.

When a transmission is new, the frictional coefficients of frictionally engaged transmission components is substantially high, however, after an initial 'breaking in' period, as the frictionally engageable elements are subject to use, this frictional coefficient becomes reduced. The line pressure in the transmission must insure sufficient pressure to maintain suitable engagement capacity of the frictionally engageable elements after this 'breaking in' period to assure normal transmission operation. This means however, that when the transmission is new and the frictional coefficient of frictionally engageable elements is high, a higher than necessary line pressure is present in the transmission causing an undesirable 'shift shock' to occur during shifting in a new transmission. However, in conventional automatic transmissions, the line pressure is always adjusted to the same degree according to the same throttle valve angle even when the transmission is new and therefore such an undesirable 'shift shock' feeling cannot be prevented.

SUMMARY OF THE INVENTION

It is therefore a principal object of the present invention to overcome the drawbacks of the prior art.

It is a further object of the present invention to provide an automatic transmission in which shift shock is prevented when a relatively low shifting frequency is present.

In order to accomplish the aforementioned and other objects, a line fluid pressure control arrangement for an automotive automatic transmission including a frictional element operative so as to be engaged and/or disengaged according to occurrence of shifting in the automatic transmission, comprises: frictional coefficient determining means determining a frictional coefficient of the frictional element; fluid pressure determining means, determining an appropriate line fluid pressure for the automatic transmission based on the frictional coefficient of the frictional element and outputting a signal indicative thereof; and an actuator, receiving the signal from the fluid pressure determining means and operable to adjust a line pressure of fluid in the automatic transmission based on the signal.

According to a further aspect of the present invention, a line pressure control arrangement for an automatic transmission, comprises: sensing means detecting occurrence of shifting in the automatic transmission and outputting a signal indicative thereof at each occurrence of shifting in the automatic transmission; means for calculating a shift frequency of the automatic transmission on the basis of signals input from the sensing means and calculating a frictional coefficient of a frictionally engageable member of the automatic transmission on the basis of the shift frequency and, determining a line pressure correction value dependent on the frictional coefficient and outputting a signal indicative thereof; and actuating means receiving the signal from the determining means, and operable to adjust a line fluid pressure present in the automatic transmission according to the line pressure correction value.

According to a still further aspect of the present invention, a process for controlling line pressure in an automotive automatic transmission, comprises the steps of: detecting occurrence of shifting in the automatic transmission and a degree of opening of a throttle valve of an engine operatively associated with the automatic transmission; calculating a shift frequency of the automatic transmission on the basis of each detected incidence of shifting and a degree of throttle opening detected at a time corresponding to each occurrence of shifting; determining a frictional coefficient of a frictionally engageable member off the automatic transmission on the basis of the shift frequency; deriving a line pressure correction value based on the frictional coefficient; adjusting a line fluid pressure present in the automatic transmission according to the line pressure correction value.

BRIEF DESCRIPTION OF THE DRAWINGS

In the drawings:

FIG. 3 is a chart showing engagement of frictionally engageable elements in the automatic transmission at different speed ranges and gear ratios thereof;

DESCRIPTION OF THE PREFERRED EMBODIMENT

Figure 1:
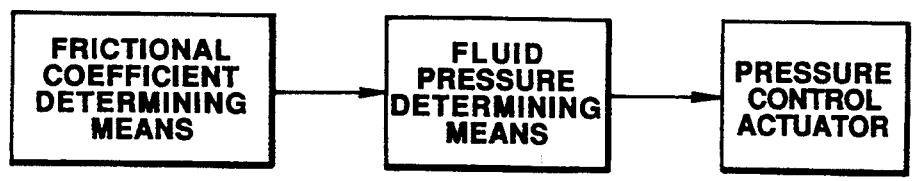
FIG. 1 is a block diagram of the fluid pressure control arrangement of the invention.
Figure 2:
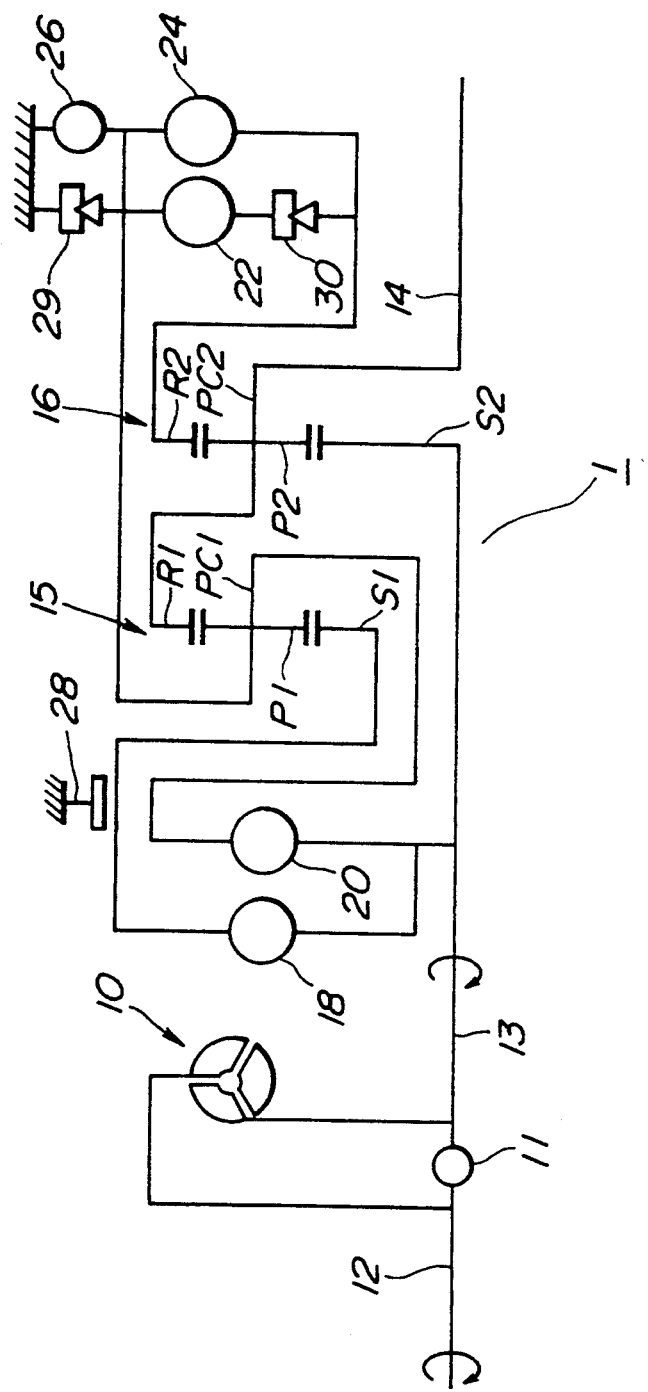
FIG. 2 is a schematic diagram of an automatic transmission according to the invention.

Referring now to the drawings, particularly to FIG. 2, a schematic diagram of an auto-drive type automatic transmission 1 having four forward speed ranges and one reverse speed range, is shown. The automatic transmission includes a torque converter 10 interposed between an engine output shaft 12 and input shaft 13 of the transmission 1. Final output driving force of the transmission is output via a transmission output shaft 14. Between the input shaft 13 and the output shaft 14, a first planetary gearset 15 and a second planetary gearset 16, a reverse clutch 18, a high clutch 20, a forward clutch 22, and overrunning clutch 24, a low and reverse clutch 26, a handbrake 28, a low one-way clutch 29 and a forward one-way clutch 30 are operatively arranged.

In addition, the torque converter 10 has a built-in lock-up clutch 11. The first planetary gearset 15 includes a sun gear S1 and an ring gear R1 which simultaneously engage a pinion gear P1 supporting pinion carrier PC1. The second planetary gearset 16 similarly includes a sun gear S2, an ring gear R2, both simultaneously engaging a pinion gear P2 supporting a pinion carrier PC2. The pinion carrier PC1 may be connected with the input shaft 13 via the high clutch 20, while the sun gear S1 may be connected to the input shaft 13 via the the reverse clutch 18. The pinion carrier PC1 is also connected in series with the forward clutch 22 and the forward one-way clutch 30 and while the forward one-way clutch 30 and the forward clutch 22 are connectable in parallel with the ring gear R2 of the second planetary gearset 16 via the overdrive clutch 24. The sun gear S2 of the second planetary gearset 16 is continuously connected to the input shaft 13 while the ring gear R1 of the first planetary gearset 15 and the pinion carrier PC2 of the second planetary gearset 16 are continuously connected to the output shaft 14. The low and reverse brake 26 is operable to engage the pinion carrier PC1 of the first planetary gearset 15 while the band brake 28 is operable to engage the sun gear S1 for braking thereof. The low one-way clutch 29 is arranged so as to allow normal rotation of the pinion carrier PC1, that is, rotation in the direction of the engine output shaft 12, while rotation of the pinion carrier PC1 in the reverse direction is prevented.

The above described transmission driving arrangement allows various interconnections of the clutches 18, 20, 22 and 24, and brakes 26 and 28 with the planetary gear sets 15 and 16 and the elements thereof (S1, S2, R1, R2, PC1 and PC2) for allowing various relationships between the rotational speed of the input shaft 13 and that of the output shaft 14, to be established. FIG. 3 is a chart showing engagement of the clutches 18, 20, 22, and 24 and the brakes 26 and 28 in each of the four forward speed ranges and single reverse speed range of the automatic transmission of the invention. Engagement of the clutches and/or brakes is indicated by a while α1 and α2 respectively define a ratio of engagement between the ring gears R1 and R2 and the sun gears S1, S2 while the gear ratio is indicative of the speed of the output shaft 14 relative the input shaft 13.

Figure 4:
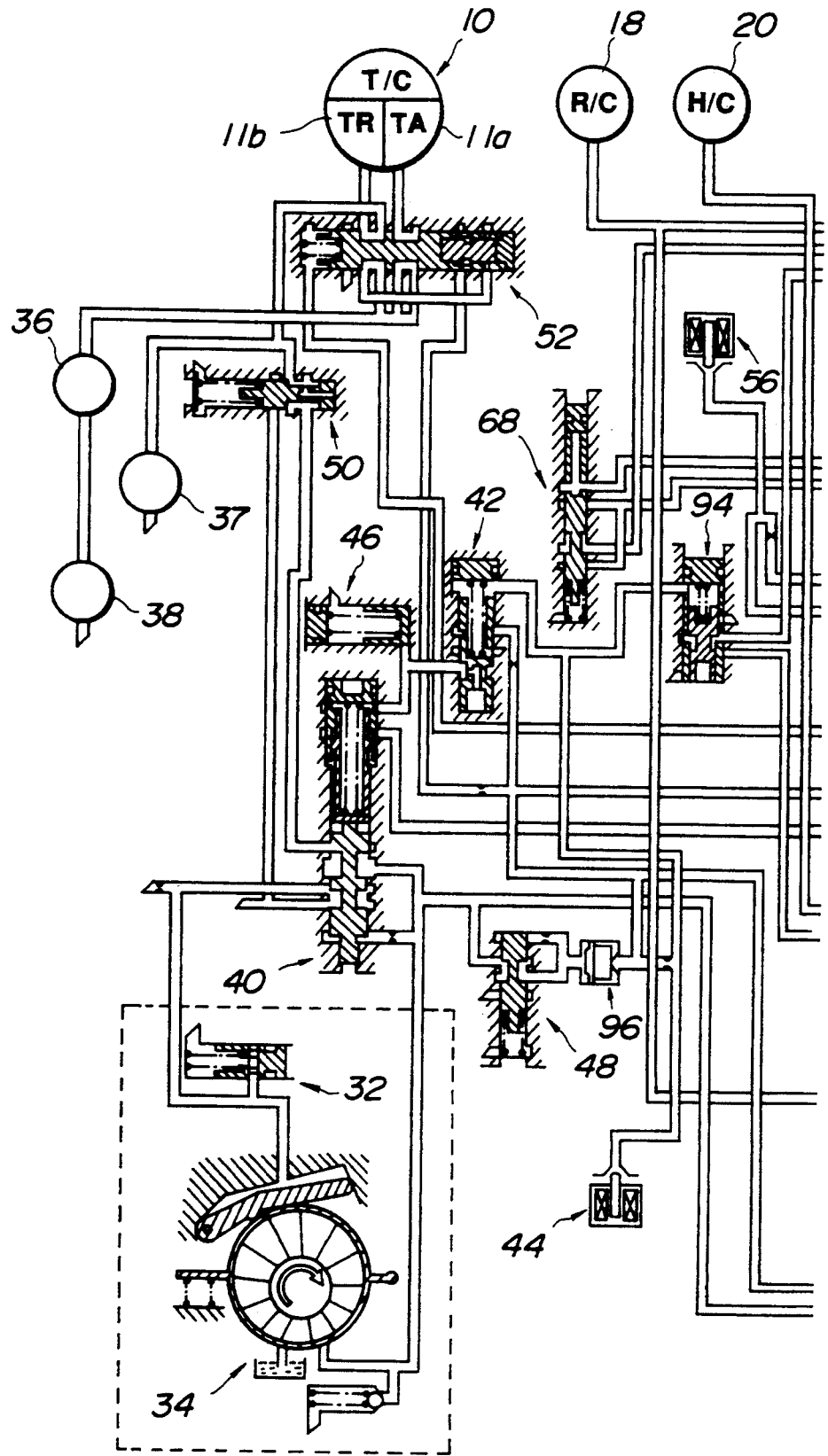
FIG. 4 shows a schematic diagram of a left side of a hydraulic circuit in an automatic transmission according to the invention.
Figure 5:
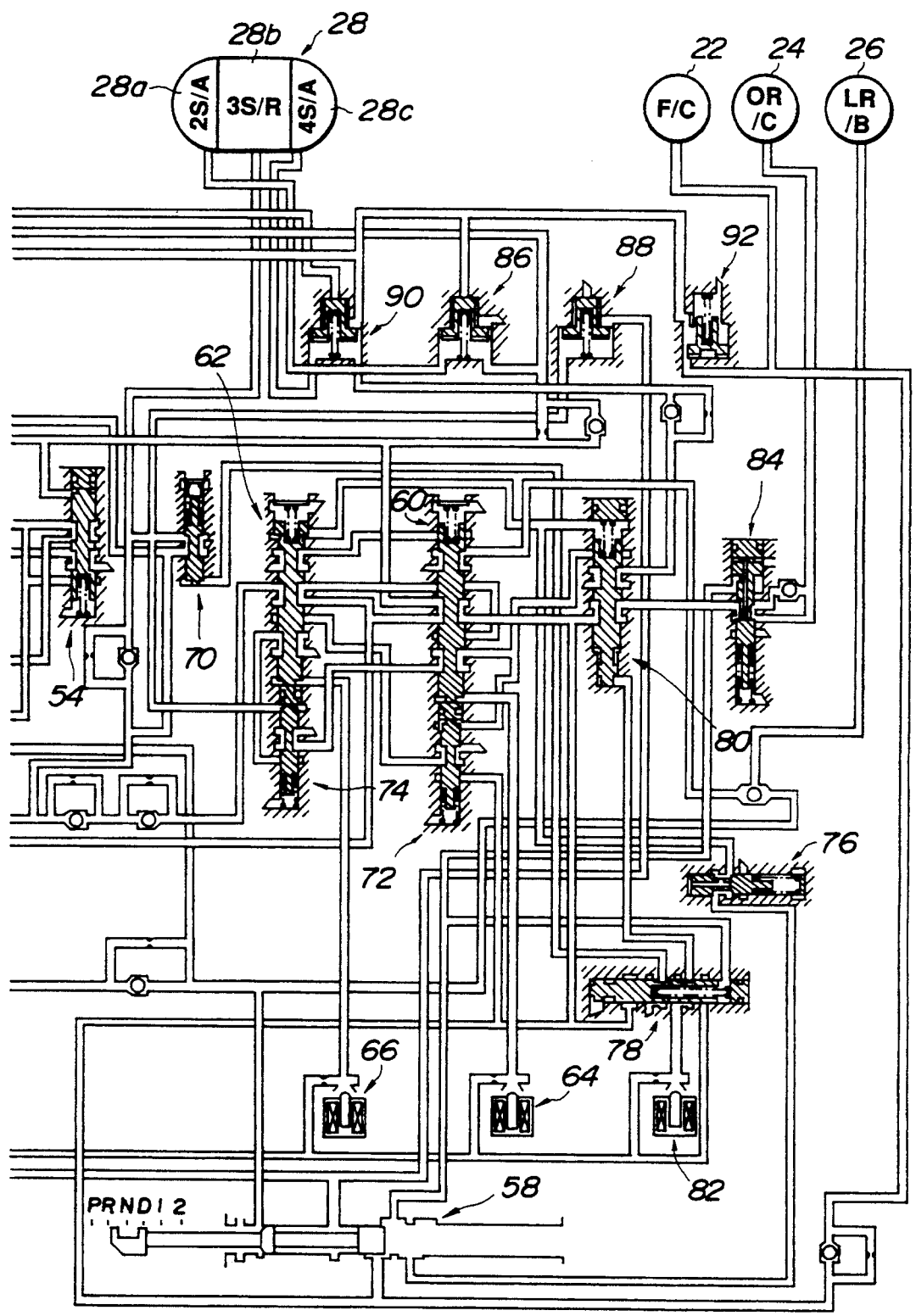
FIG. 5 a schematic diagram of a right side a hydraulic circuit in an automatic transmission according to the invention.
Figure 6:
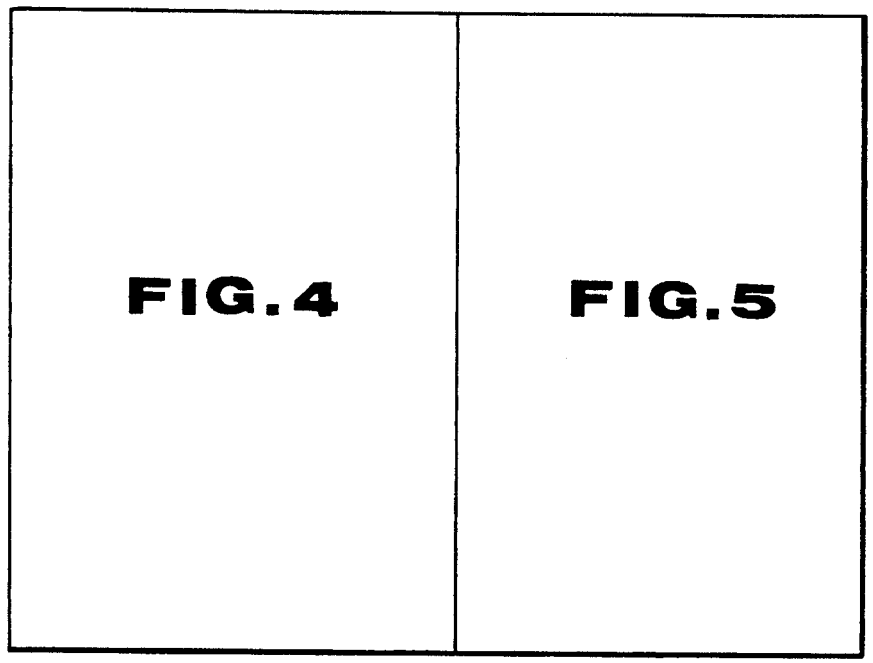
FIG. 6 is a combined view of FIGS. 4 and 5.

FIGS. 4, 5 and 6 show the layout of a fluid circuit and fluid pressure control arrangement of the automatic transmission according to the invention. As seen in the drawings, a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, servo-charger valve 68, a 3-2 timing valve 70, a 4-2 relay valve 72, a 4-2 sequence valve 74, a fast reducing valve 76, a second shuttle valve 78, an overrunning clutch control valve 80, an overrunning clutch solenoid 82, an overrunning clutch reducing valve 84, a 1-2 accumulator 86, a 2-3 accumulator 88, a 3-4 accumulator 90, a N-D accumulator 92, an accumulator control valve 94, a filter 96, or the like, are provided. It will be noted that the above elements are mutually interconnected. Further, the above mentioned torque converter 10, as well as an apply chamber 11a and a release chamber 11b of the lock-up clutch 11 thereof, the forward clutch 2, the high clutch 20, the band brake 28 (including a second gear apply chamber 28a, a third gear release chamber 28b and a fourth gear apply chamber 28c thereof), the reverse clutch 18, the low and reverse brake 26, and the overrunning clutch 24 are also interconnected. Furthermore, a feedback accumulator 32 is provided and a variable volume vane type oil pump 34, an oil cooler 36, a forward lubricating circuit 37 and a rear lubricating circuit 38 are provided which are also mutually interconnected. The operation of these elements is will not be explain herein in detail. The interaction of the above-described transmission components has been fully disclosed in the above-mentioned U.S. Pat. No. 4,730,521, assigned to tile common assignee of the present invention, and incorporated herein by reference.

Figure 7:
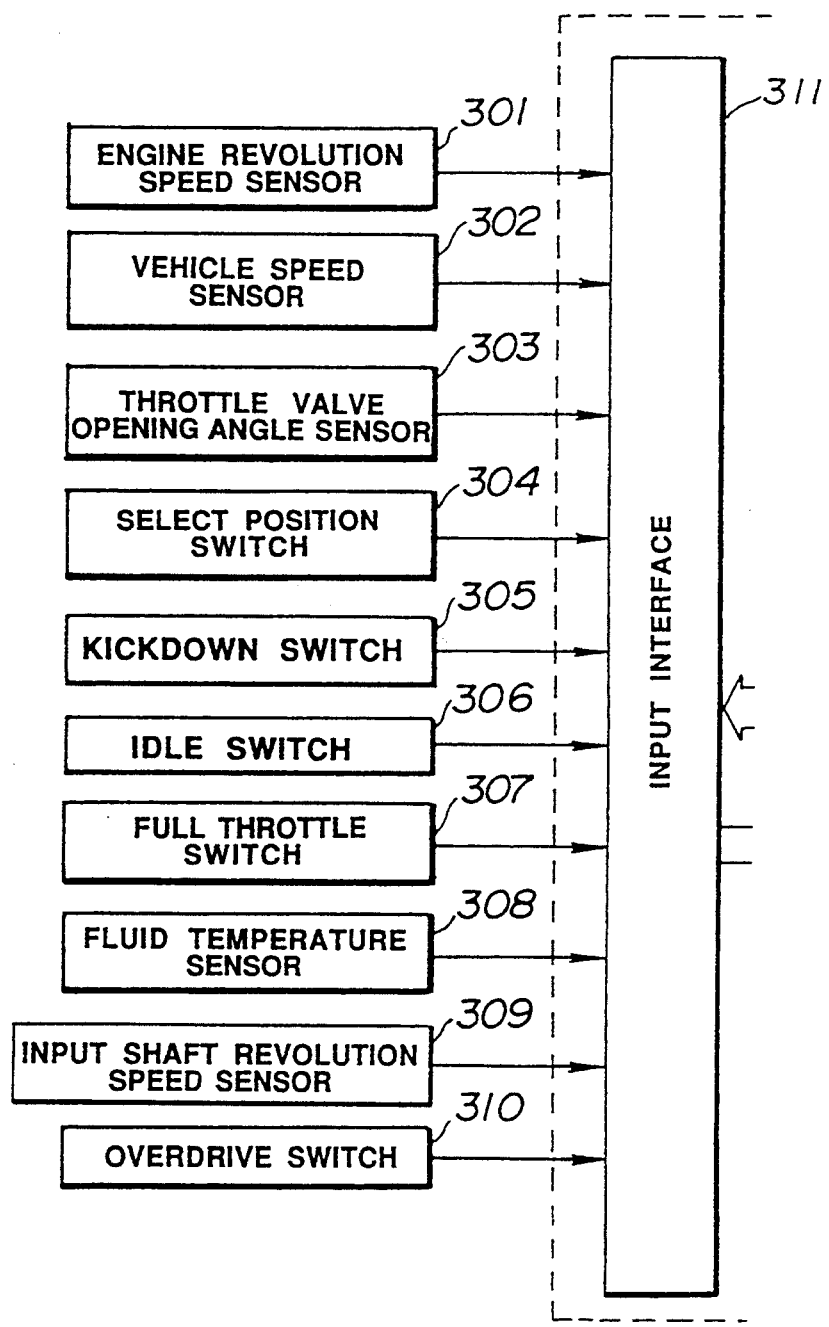
FIG. 7 an explanatory diagram of a left side control unit of the invention.
Figure 8:
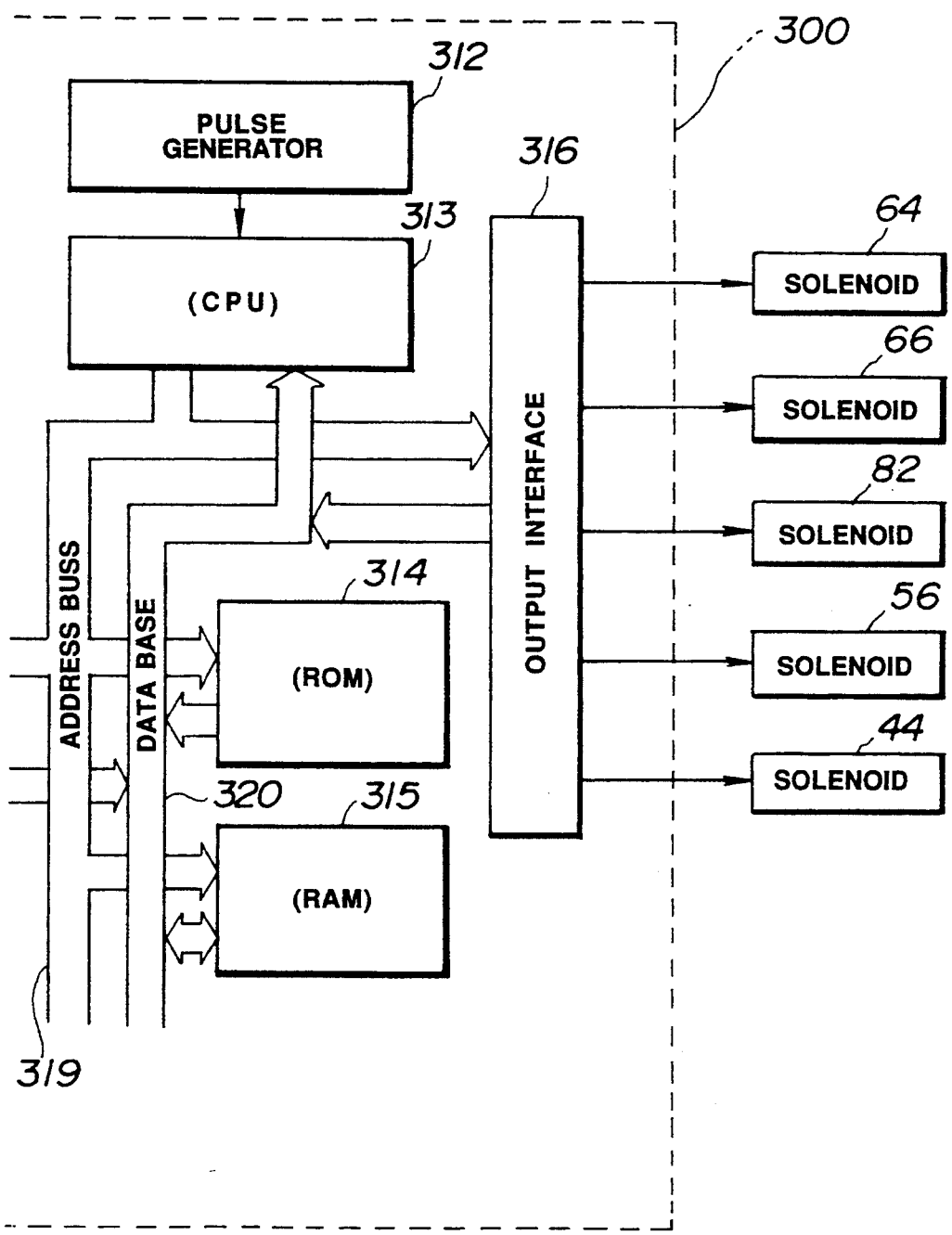
FIG. 8 an explanatory diagram of a right side control unit of the invention.
Figure 9:
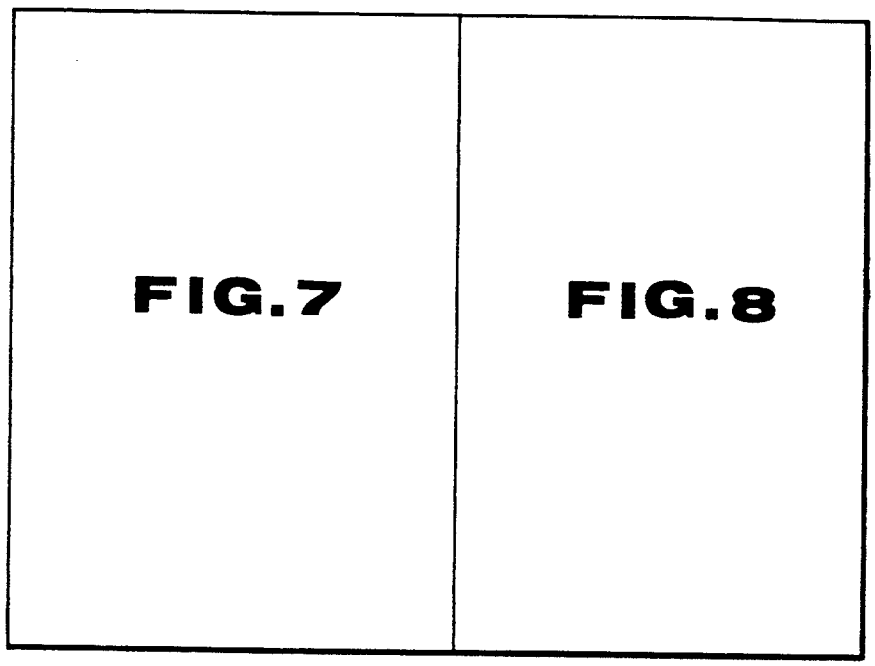
FIG. 9 is a combined view of FIGS. 7 and 8.

FIGS. 7, 8 and 9 are block diagrams explaining operation of a control unit 300 for controlling operation of the solenoids 44, 56, 64, 66 and 82. The control unit 300 comprises an input Interface 311, a pulse generator 312, a CPU 313, ROM (Read Only Memory) 314, RAM (Random Access Memory) 315 and an output interface 316. The above-mentioned elements are interconnected via an address buss 319 and a database 320. The control unit 300 receives input signals from a engine revolution speed sensor 301, a vehicle speed sensor 302, a throttle opening angle sensor 303, a select position switch 304, a kickdown switch 305, an idle switch 306, a full throttle switch 307, a fluid temperature sensor 308, and input shaft revolution speed sensor 309 and an overdrive switch 310 via the input interface 311. On the other hand the control unit outputs control signals to the first and second shift solenoids 64, 66, the overrunning clutch solenoid 82, the lock-up solenoid 56 and the line pressure solenoid 44, via the output interface 316.

Figure 10:
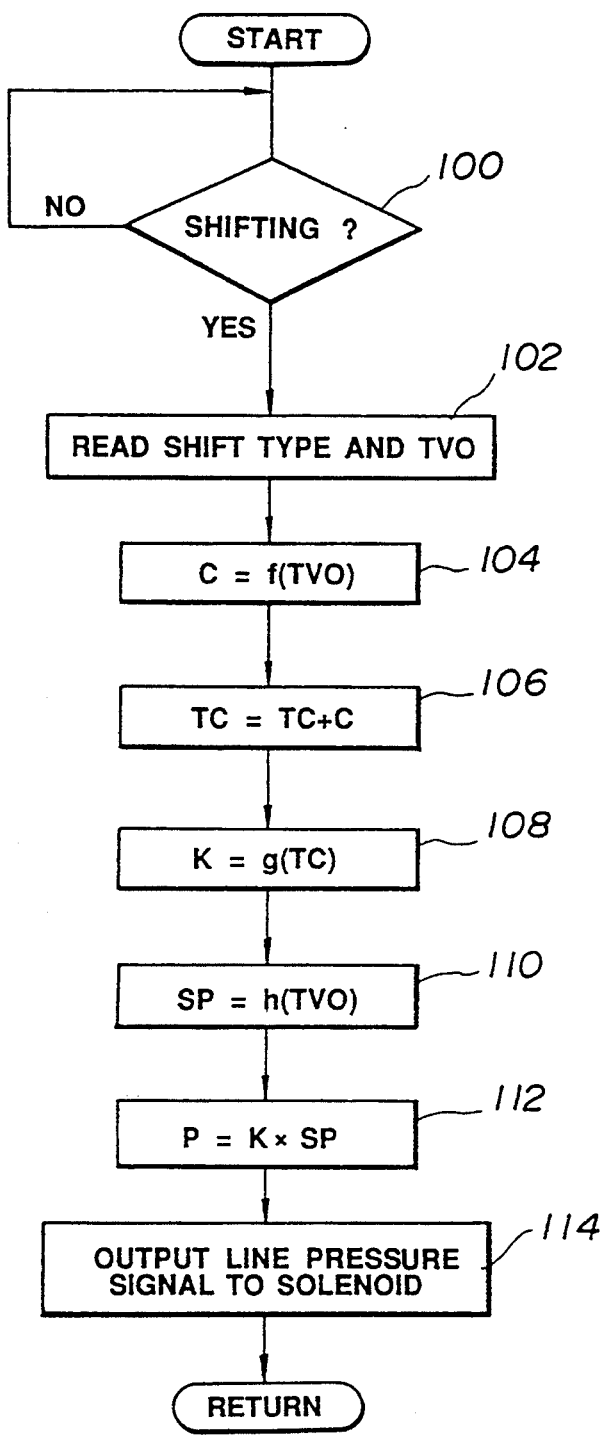
FIG. 10 is a flowchart explaining fluid pressure control operation according to the invention.
Figure 11:
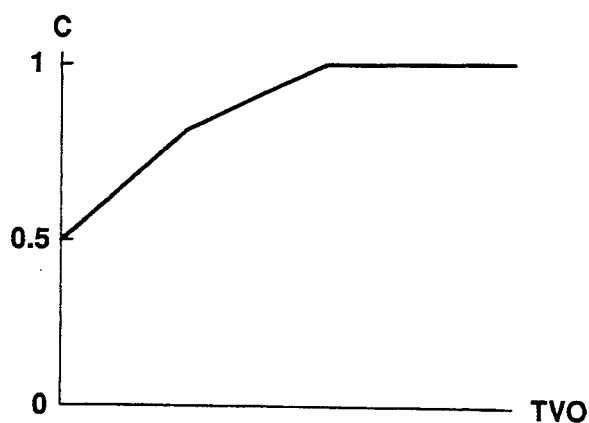
FIG. 11 is a graph showing a relationship between throttle opening angle and a shift correction value according to the invention.
Figure 12:
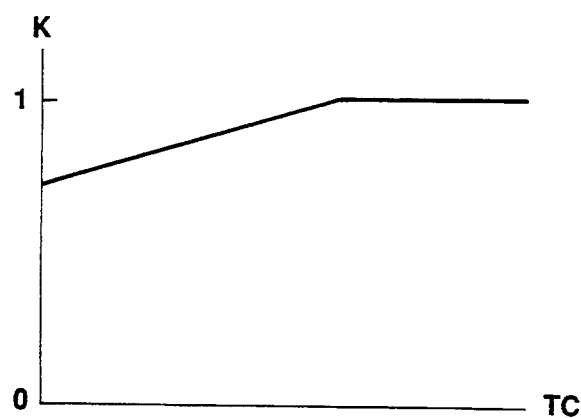
FIG. 12 is a graph showing a relationship between shift frequency and an fluid pressure correction coefficient according to the invention.
Figure 13:
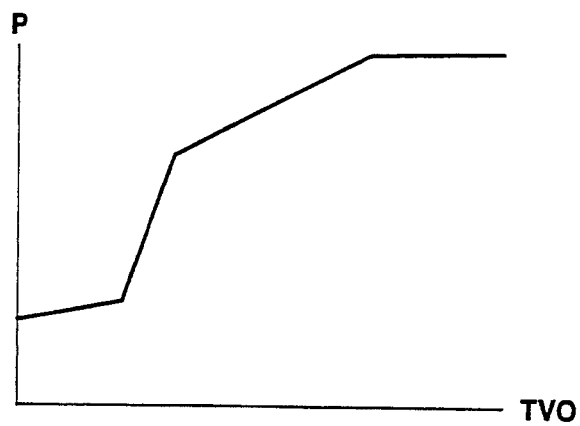
FIG. 13 is a graph showing a relationship between throttle opening angle and fluid pressure at the time of shifting in an automatic transmission according to the invention.

Line fluid pressure control of the automatic transmission as described above will be described hereinbelow in detail with reference to FIG. 10. Referring to FIG. 10, first, at a step 100, a determination is made as to whether the transmission is in a shift mode or not, if NO then step 100 is repeated until shifting is detected. When the answer is YES at step 100 the routine proceeds to a step 102 where the type of shift and the throttle valve opening angle (TVO) at the time of shifting is read. Then at a step 104 a shift frequency correction value C is adjusted in response to the read type of shift 'F' and TVO. FIG. 11 shows the relation between the shift frequency correction value C and the degree of opening of the throttle valve, that is, at a completely open position of the throttle valve, the value of C is set to 1 and at a completely closed condition of the throttle valve, the value of C is set to 0.5. Then at a step 106, a total shift frequency correction TC is calculated on the basis of the value of C and the value of TC from the previous routine cycle. Next, at a step 108 a fluid pressure correction coefficient K is determined based on the total shift frequency correction TC. FIG. 12 shows the relationship between the total shift frequency correction TC and the fluid pressure coefficient K. As may be seen in the drawing, the value of the fluid pressure coefficient K rises, from a value slightly below 1, to a set value of TC when a K value of 1 is reached, after which the value is maintained at the same level. Then, referring again to FIG. 10, at a step 110, a shift pressure SP is read from a shift pressure map (shown in FIG. 13), contained in memory, based on the detected TVO. Next, at a step 112, a shift time pressure adjustment value P is determined based on the read shift pressure SP and the fluid pressure coefficient K. Then, at a step 114, a control signal is output from the control unit 300 to the line pressure solenoid 44 based on the obtained shift time pressure adjustment value P.

Thus, according to the above arrangement, steps 102–108 comprise frictional coefficient determining steps, and steps 110 and 112 are fluid pressure determining steps according to the invention. The line pressure solenoid comprises a pressure control actuator.

Therefore, when a total shift frequency TC is relatively low, an overall line fluid pressure correction value K is kept at a value below 1, and a fluid pressure during shifting is maintained at a comparatively low value since when the frictionally engageable elements of the transmission are new, a high frictional coefficient is initially present and a relatively low fluid pressure is sufficient for engagement of the frictionally engageable elements of the automatic transmission.

Increase in the total shift frequency will thus result in the fluid pressure correction coefficient becoming larger and the shift fluid pressure will become substantially higher. Thus, even as the frictional coefficient of the frictionally engageable elements decreases with use over time, sufficient engagement capacity is certainly maintained. According to the total shift frequency TC increase, the fluid pressure coefficient K is increased to the value of 1, after which this value is maintained. This step assures that the frictionally engageable elements remain in stable engagement condition, and the frictional coeffficient is held substantially without variation, assuring sufficient shift time engagement capacity. Further, the shift frequency correction value C is made responsive to throttle opening angle TVO, since the extent of influence of shifting with a small throttle opening angle on the frictional coefficient of the frictionally engageable elements is comparatively small as compared with shifting with a large throttle, thus the accuracy of correction can be enhanced and calculation thereof can be simply carried out.

Also, according to the present embodiment, the type of shift is also detected, thus the control arrangement of the present invention may be embodied so as to calculate a total shift frequency based only on particular types of shifts. For example, since the ratio of forward speed shifting to reverse shifting is high, the system of the invention may be adapted to calculate a total shift frequency based only on forward shifting or alternatively, only on shifts having a throttle valve opening angle above a predetermined threshold.

Thus, according to the present invention, a frictional coefficient of frictionally engaging elements of an automatic transmission can be certainly maintained at a sufficient engagement capacity even though a frictional coefficient of the elements may become reduced over extended periods of use.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A line fluid pressure control arrangement for an automatic transmission for a vehicle including a frictional element operative so as to be engaged and/or disengaged according to occurrence of shifting in said automatic transmission, comprising:

an actuator;
a control unit; and
sensing means active to detect at least a throttle opening and a vehicle speed and outputting signals indicative thereof to said control unit;
said control unit including:
frictional wear calculating means active to update a value representing wear sustained by said frictional element based on a number of engagements of said frictional element and a throttle opening angle present at time of shifting and outputting a signal indicative thereof; and
fluid pressure correction value determining means, active to determine an appropriate correction value of line fluid pressure for said automatic transmission based on map data of fluid pressure correction amounts corresponding to said value representing wear sustained by said frictional element and outputting a signal indicative thereof;
said actuator being disposed in a hydraulic circuit of said automatic transmission for controlling application of said frictional element and receiving said signal from said fluid pressure correction value determining means, said actuator being operable to adjust a line pressure of working fluid in said automatic transmission based on said signal from said fluid pressure correction value determining means.

2. A control arrangement as set forth in claim 1, wherein said control unit further determines a type of shifting occurring in said automatic transmission, said value representing wear sustained by said frictional element being calculated on the basis of a selected type or shifting and a throttle opening angle present during said selected type of shifting.

3. A control arrangement as set forth in claim 1, wherein said control unit further calculates said value representing wear sustained by said frictional element such that a lower degree of throttle opening during shifting is given a lower value and a higher degree of throttle opening during shifting is given a higher value.

4. A control arrangement as set forth in claim 1, wherein said sensing means is further active to detect a gear selector position, a speed of an engine connected to said transmission, a rotational speed of an input shaft of said transmission, engagement of an overdrive mode of said transmission, engagement of idling of said transmission, engagement of full throttle of said engine, and sudden acceleration demand at an accelerator pedal of said vehicle.

5. A control arrangement as set forth in claim 1, wherein said sensing means comprises:
a vehicle speed sensor, an overdrive switch, an idle switch, a full throttle switch, a kickdown switch, a throttle opening angle sensor, a gear selector position switch, an engine rotational speed sensor, and an input shaft rotational speed sensor.

6. A process for controlling line pressure in a hydraulic circuit active to activate a frictional element of an automatic transmission, comprising the steps of:

detecting occurrence of shifting in said automatic transmission and a degree of opening of a throttle valve of an engine operatively associated with said automatic transmission;

calculating a value representative of frictional wear applied to said frictional element on the basis of total detected occurrences of shifting and a degree of throttle opening detected at a time corresponding to each occurrence of shifting;

deriving a line pressure correction value based on said value representative of frictional wear and map data correlative of frictional wear and line pressure correction; and adjusting a line fluid pressure present said automatic transmission according to said line pressure correction value.

7. A process as set forth in claim 6, further including a step, before said calculating step, of detecting a type of shifting occurring in said automatic transmission, said calculating of said value representative of frictional wear applied to said frictional element being based on a number of occurrences of a predetermined type of shifting.

8. A process as set forth in claim 6, further including a step, before said calculating step, of detecting a type of shifting occurring in said automatic transmission, said calculating of said value representative of frictional wear applied to said frictional element being based on a total number of occurrences of a predetermined type of shifting wherein a throttle opening is above a predetermined value.

9. A process as set forth in claim 6, further including a step, before said calculating step, of detecting a type of shifting occurring in said automatic transmission, said calculating of said value representative of frictional wear applied to said frictional element being based on a total number of occurrences of a predetermined type of shifting wherein a throttle opening is below a predetermined value.

10. A process as set forth in claim 6, wherein said step of calculating said value representative of frictional wear applied to said frictional element is carried out such that a lower degree throttle opening is given a lower value and a higher degree throttle opening is given a higher value.

11. A line fluid pressure control arrangement for an automotive transmission including a frictional element, comprising:

an actuator; and a control unit active to control said actuator for adjusting line pressure of working fluid in a hydraulic circuit controlling said frictional element, wherein said control unit is active to determine a line pressure correction value determined according to at least a number of engagements of said frictional element, a throttle opening angle present upon occurrence of shifting, and map data correlative of the number of engagements of said frictional element and a correction amount for line fluid pressure of said transmission, said control unit being further active to control said actuator to increase said line fluid pressure by an amount corresponding to said determined line pressure correction value.

12. A line fluid pressure control arrangement as set forth in claim 11, wherein occurrence of shifting with a higher throttle opening angle is given a higher value than occurrence of shifting at a lower throttle opening angle during determination of said line pressure correction value.

13. A method for adjusting line fluid pressure for controlling engagement of a frictional element in a transmission associated with an internal combustion engine, comprising the steps of:

counting a number of engagements of said fictional element, said counting modified by a throttle opening angle of said engine at the time of engagement of said frictional element such that a higher value is given to engagement of said frictional element at a higher throttle opening angle than to engagement of said frictional element at a lower throttle opening angle;

determining an amount of increase in a present line fluid pressure of said transmission based on a total number of engagements of said frictional element derived in said counting step and map data correlative of the number of engagements of said frictional element and a degree of line fluid pressure correction; and increasing a line pressure in said transmission according to said amount of increase derived in said determining step.

14. A method as set forth in claim 13, wherein, in said counting step, a predetermined type of shift only is counted.

15. A method as set forth in claim 14, wherein said predetermined type of shift is a forward shift.

16. A method as set forth in claim 14, wherein, in said counting step, only a predetermined type of shift occurring when a throttle opening angle of said engine is above a predetermined level is counted.

17. A method as set forth in claim 13, wherein, in said counting step, only a predetermined type of shift occurring when a throttle opening angle is below a predetermined level is counted.

* * * * *

UNITED STATES PATENT AND TRADEMARK OFFICE
CERTIFICATE OF CORRECTION

PATENT NO. : 5,376,058
DATED : December 27, 1994
INVENTOR(S) : Yoshiaki Ueda

It is certified that error appears in the above-identified patent and that said Letters Patent is hereby corrected as shown below:

Title page,
Please delete the following:

item [[30] Foreign Application Priority Data
     May 20, 1991   [JP]   Japan......3-143836]

Signed and Sealed this

Twenty-second Day of August, 1995

Attest:

BRUCE LEHMAN

Attesting Officer          Commissioner of Patents and Trademarks